United States Patent Office 3,191,886
Patented June 29, 1965

---

3,191,886
GAS TURBINE JET PROPULSION ENGINE UNITS FOR AIRCRAFT AND ALSO JET PROPELLED AIRCRAFT
Gordon Manns Lewis, Bristol, England, and Michel Henri Marie Joseph Wibault, deceased, late of New York, N.Y., by Madeleine Omerine Marie Josephine Wibault, Paris, and Pierre Achille Marie Joseph Wibault, Douai, France, Marie Rose Wibault, Ouchy, Switzerland, Helene Madeleine Marie Joseph Chollet, Gonzague Charles Rodolphe Marie Joseph Wibault, Monique Marie Joseph Locoge, Madeleine Odette Marie Joseph Robine, and Pierre Leon Robine, Paris, France, executors, assignors, by mesne assignments, to Bristol Siddeley Engines Limited, Bristol, England, a British company
Continuation of application Ser. No. 711,350, Jan. 27, 1958. This application Aug. 19, 1963, Ser. No. 304,718
Claims priority, application Great Britain, Jan. 29, 1957, 3,146/57, Patent 881,662
28 Claims. (Cl. 244—23)

This invention relates to gas turbine jet propulsion engine units for aircraft and also jet propelled aircraft and is a continuation of application Serial No. 711,350, filed January 27, 1958, now abandoned.

This invention relates to propulsion units comprising a jet propulsion engine of the type including a gas turbine and an engine air compressor driven thereby and supplying the required combustive air and, more particularly—though not exclusively—to such units adapted to be used as a single or as an auxiliary motive power means in and for an aircraft.

An objective of the invention is to provide a propulsion unit of this type, comprising in combination with said engine, an additional air compressor driven by the turbine of said engine, the air compressed by said additional compressor being used in the form of at least one orientable jet as an additional power medium to vary the intensity and/or the direction of the motive action exerted by the exhaust gases of the gas turbine.

A more specific object of the invention is to provide, in and for an aircraft, a jet propulsion unit of the type described, wherein the orientation facilities of said air jet, or jets, as well as if desired, those of the usual gas jet or jets, and the location on the aircraft of the nozzles associated with said jets are such that said jets can provide either pure lift forces, e.g., for vertical take-off or landing or landing or hovering flight, or again direct propelling thrust, or reverse thrust, e.g., for braking or finally, any desired combination of thrust and lift forces.

Another object of the invention is to provide a jet propulsion unit of the type described, wherein said additional air compressor is of the axial flow type, so as to make the unit compact by reducing its volume and, more particularly, its overall diameter.

For the same purpose, it is another object of the invention to use axial flow type compressors, both for supplying combustive air and for generating the additional air jet power medium, said axial flow compressors then being preferably disposed co-axially.

A further object of the invention is to provide a jet propulsion unit of the type described including a high pressure turbine directly fed with the combustive chamber output gases and directly driving the usual engine compressor, and a second turbine fed with low pressure gases from said high pressure turbine, said second turbine rotating at a relatively low speed and driving the above-mentioned additional air compressor.

A more specific object of the invention is to so design the unit described in the last paragraph, that said relatively low speed be sufficiently reduced to permit direct driving of said additional air compressor and to drive the latter directly from said low pressure turbine.

This arrangement results in completely eliminating the complications resulting from the use of a high ratio reduction gear, such as those used in turbo-propellers.

Still another object of the invention is to design, as a new article of manufacture, a jet propulsion unit of a small diameter and elongated shape, comprising a jet propulsion engine having two co-axial gas turbines and a single axial flow engine air compressor co-axial therewith to supply the required combustive air, combined with an additional axial flow air compressor also co-axial with said turbines and directly driven from the turbine located downstream of the other, while said engine compressor is driven directly from said other turbine.

The power developed by the jet gases may be made substantially equal to that developed by the jet air, the unit then being provided with one pair of air jet nozzles and one pair of gas jet nozzles, the nozzles of each pair being located symmetrically on either side of a common plane of symmetry, the resultant line of thrust on the aircraft still passing through the centre of gravity of said aircraft when the four jets are oriented vertically and downwardly.

Other objects and advantages of the invention will be apparent from the following detailed description, together with the accompanying drawings submitted for purpose of illustration only and not intended to limit the scope of the invention, reference being had for that purpose to the sub-joined claims.

In these drawings:

FIGURE 11 is a side elevational view, mostly in axial vertical section, of another aircraft according to the invention.

In the example shown in FIGURES 1 to 10, the unit comprises a three stage axial flow compressor or ducted fan 110 connected to be driven directly by a two stage low pressure turbine 113 of a gas turbine jet propulsion engine by means of the inner shaft 112 of a pair of concentric shafts, the outer one, 111, of which connects the axial flow engine compressor 114 with a single stage high pressure turbine 115 of the engine. The turbines 113 and 115 are arranged in flow series with one another, and each turbine forms part of a rotary system which is mechanically independent of the other. The two turbines are co-axially arranged with the engine compressor 114 disposed between them and the fan 110. The unit has a continuous, that is to say uninterrupted, casing or outer shell providing for air intakes at one end, the left hand end in FIGURE 1, and an outlet for combustion gases from the turbines at the other end.

Figure 1:
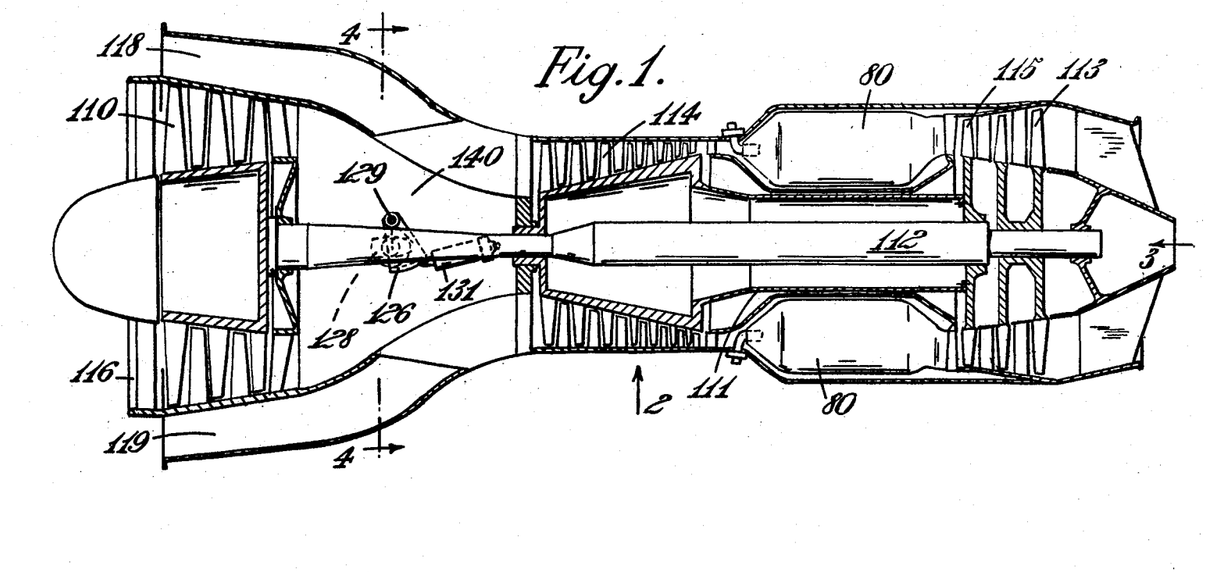
FIGURE 1 is a side elevation in cross-section of a gas turbine jet propulsion engine unit according to the invention.
Figure 2:
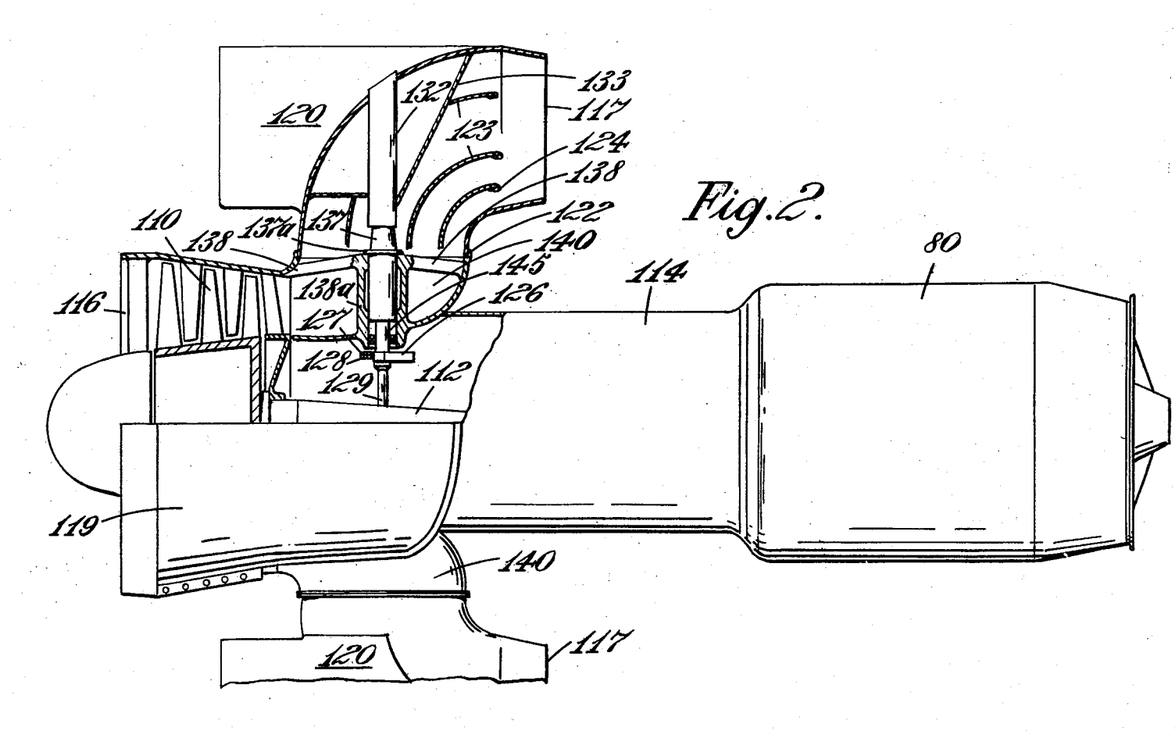
FIGURE 2 is a partial cross-sectional view of FIGURE 1 in the direction of the arrow 2.
Figures 3, 6:
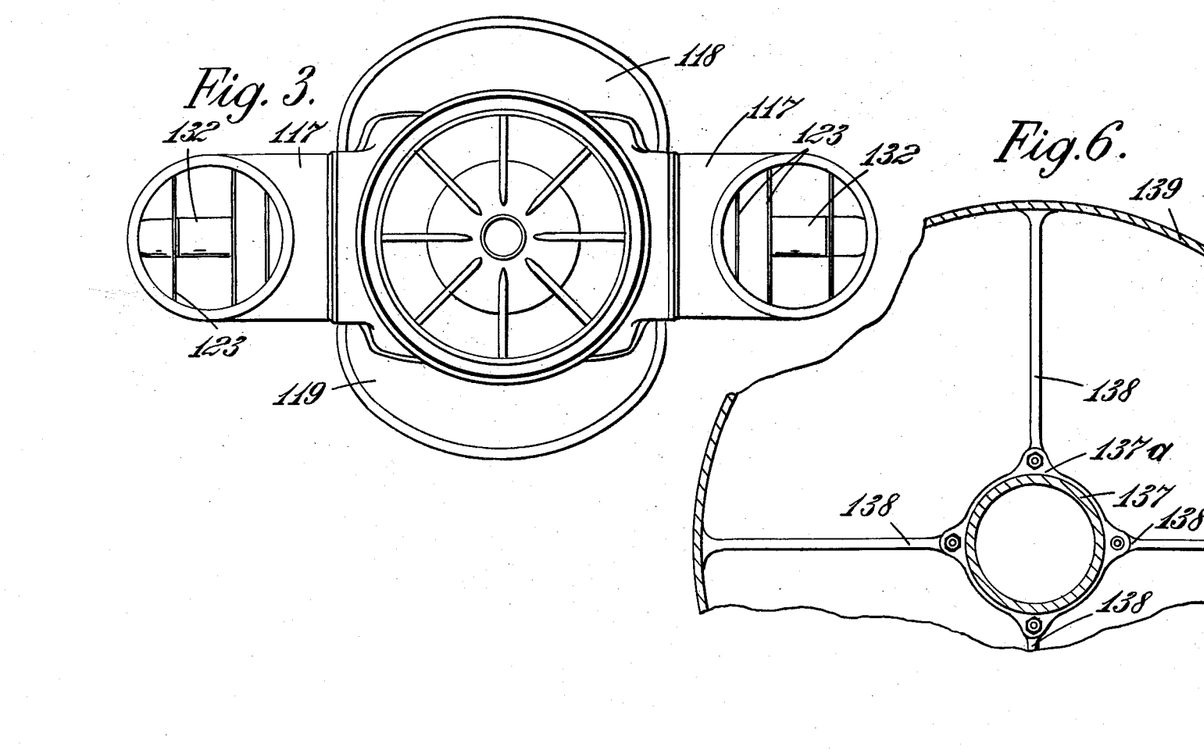
FIGURE 3 is an end view in the direction of arrow 3 in FIGURE 1.
FIGURE 6 is a section on line 6—6 in FIGURE 5, certain parts being omitted.

The fan 110 is fed with air through an annular air intake 116 and discharges compressed air in two streams directly into two jet nozzles 117 which are mounted on the outside of the unit casing between the fan and the engine compressor, and which, in the present example, are rotatable together through 100° from their position as shown so that upward, forward and, for braking, slightly rearward, thrust may be obtained. The nozzle may however be rotatable through a greater angle up to 180° to provide full braking thrust or a lesser angle so as to be able to provide only upward or upward and forward thrust. The nozzles are orientable on a common axis and are mechanically interlinked for common movement as hereinafter described, so that each nozzle is always directed in the same direction as the other.

The engine compressor 114 is fed through upper and lower air intakes 118 and 119, disposed one on each side of the intake 116, and discharges compressed air into the combustion equipment 80 of the engine whence, after it has been heated, it passes through the high and low pressure turbines 115 and 113 and is discharged therefrom.

When a unit such as is now being described is installed in an aircraft, the jet stream discharging from the turbines is led through a jet pipe to one or more further jet nozzles for discharge therethrough. Examples of such aircraft are hereinafter described with reference to FIGURES 10 to 17 of the drawings.

Figure 4:
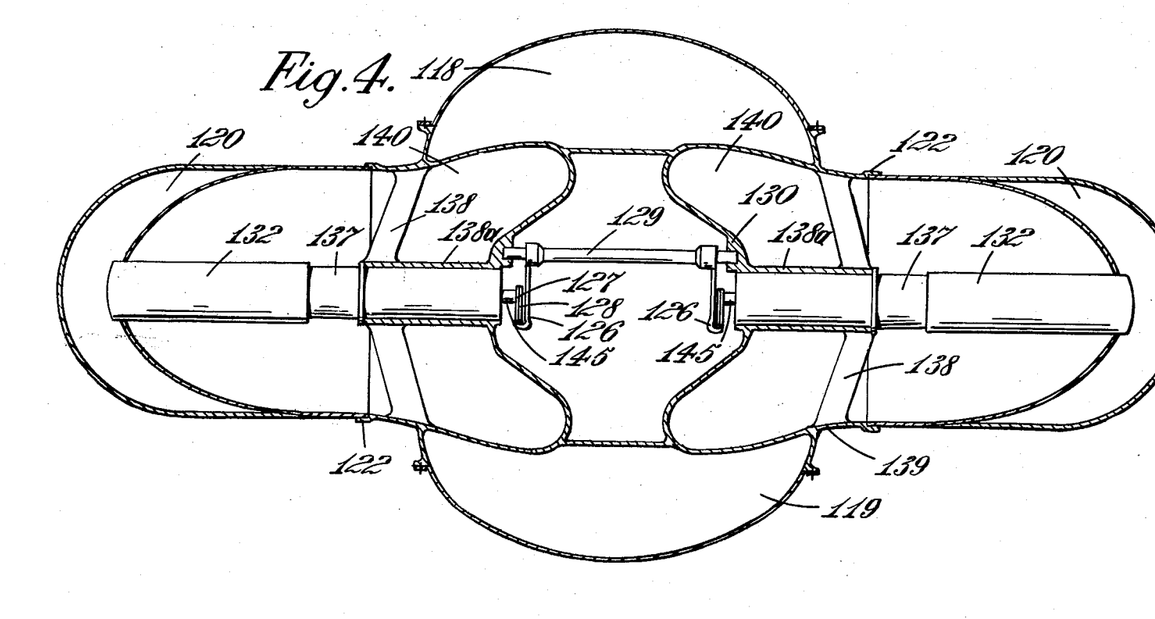
FIGURE 4 is a section on line 4—4 of FIGURE 1.
Figure 5:
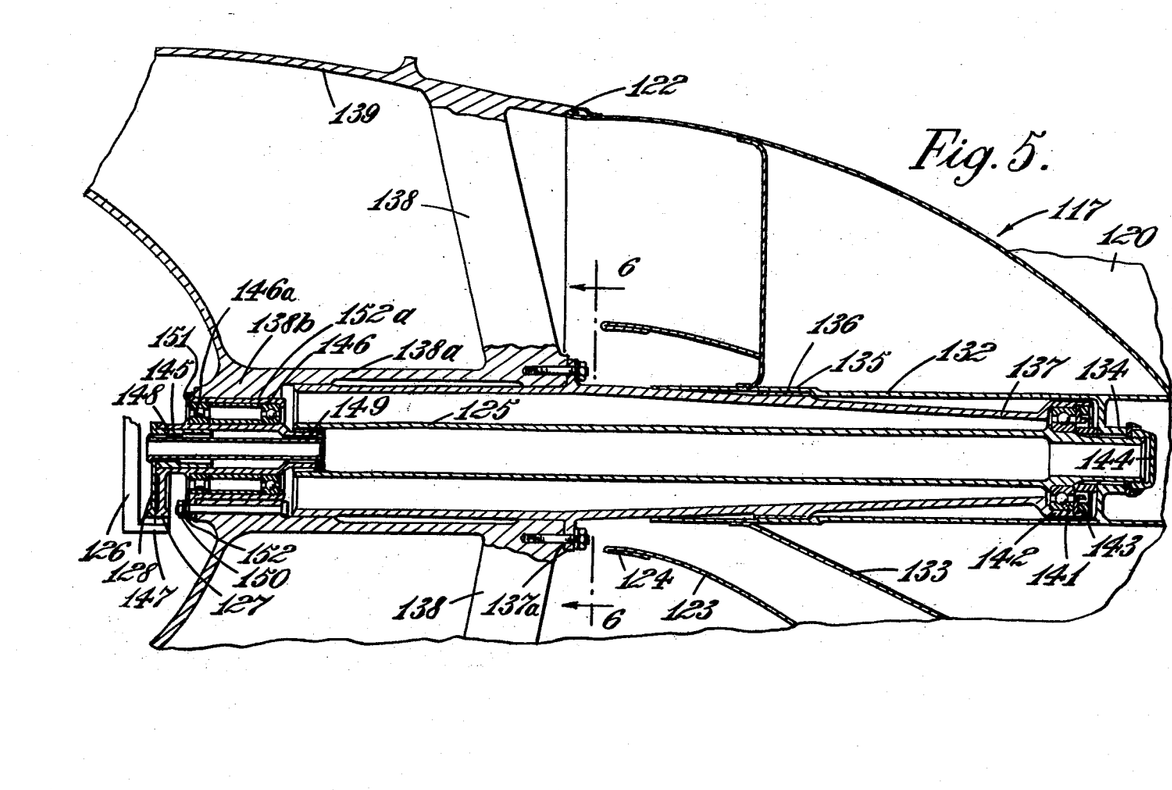
FIGURE 5 is a cross-section showing certain details of construction.

The nozzles 117 are provided with aerodynamic balancing surfaces 120 to assist in the rotation of the nozzles in the airstream during flight, and the nozzles receive the discharge of the fan each through a fan discharge passage 140 there being two such passages as indicated in FIGURE 4 of the drawings. The nozzles 117 are connected to the discharge passages 140 by annular seals 122 allowing for orientation of the nozzles with respect to the passage walls, and are stiffened internally by means of curved stiffeners 123 having reinforced edges 124, the stiffeners being shaped to act as guide vanes for the discharge through the nozzles.

The nozzles 117 are supported on torsion shafts 125 having their axes co-incident with the common axis of orientation of the nozzles and the shafts 125 are coupled together by coupling means comprising a single transmission shaft 129, and an arrangement of toothed quadrants or equivalent means 126, 127, and 128, there being two of each. The shaft 129 is held in end bearings carried by the intake casing 130 and a hydraulic jack means 131 is provided connected to one of the quadrants 126, the jack being actuable to rotate the shaft 129 whereby the torsion shafts 125 are rotated to orientate the nozzles 117 in unison.

Each nozzle has a mounting sleeve 132 which is welded to the wall of the nozzle and to a hollow supporting member 133 within the nozzle. Each mounting sleeve 132 carries internally an internally splined collar 134, and each mounting sleeve also has an internal bearing surface 135 dimensioned to slide on a self lubricating bearing surface 136 of a support tube 137. The support tube 137 has an external flange 137a which is bolted to a supporting structure comprising four angularly spaced vanes 138 carried from the air intake casing 139.

The vanes 138 carry a further support tube 138a in which is supported, cantilever fashion, but over a substantial portion of its length, the support tube 137. The torsion shaft 125 extends inside the support tube 137 and is splined to the collar 134 near its outer end, the shaft extending through the collar and being mounted at its outer end in a ball bearing 141 located in a cup 142 provided at the adjacent end of the support tube. The bearing 141 is retained in position by a retaining ring 143 screw threaded to the inner wall of the cup 142, and a cap 144 is screwed onto the outer end of the torsion shaft in order to retain the lubricant for the bearing 141 and to keep out foreign matter.

The inner end of the torsion shaft 125 passes into the tubular support 138a and is internally splined to a sleeve 145 mounted in a ball bearing 146 and a roller bearing 146a, these bearings being housed at the inboard end of the tubular support 138a in a bushing 138b formed as part of the tubular support. The sleeve 145 carries one of the quadrants 127 previously referred to, the quadrant being centered on the axis of the sleeve, and the quadrant has teeth which drivably engage with an internally toothed flange 147 on one of the quadrants 126.

The quadrants 126 are carried by the transmission shaft 129 and are centered on the axis of this shaft. The quadrants 126 each have the same effective radius which is greater than that of the quadrants 127. In the present example the effective radius of the quadrants 126 is about twice that of the quadrants 127. When the jack 131 is actuated to rotate the shaft 129 the rotational movement is transmitted to the sleeves 145 via the quadrants 126 and 127, the sleeves 145 rotating through a greater angle than the shaft 129 by virtue of the step up gears constituted by the quadrants.

Movement of the sleeves 145 is transmitted to the torsion shafts 125 which in turn rotate the nozzles 117.

Figures 7, 8, 9:
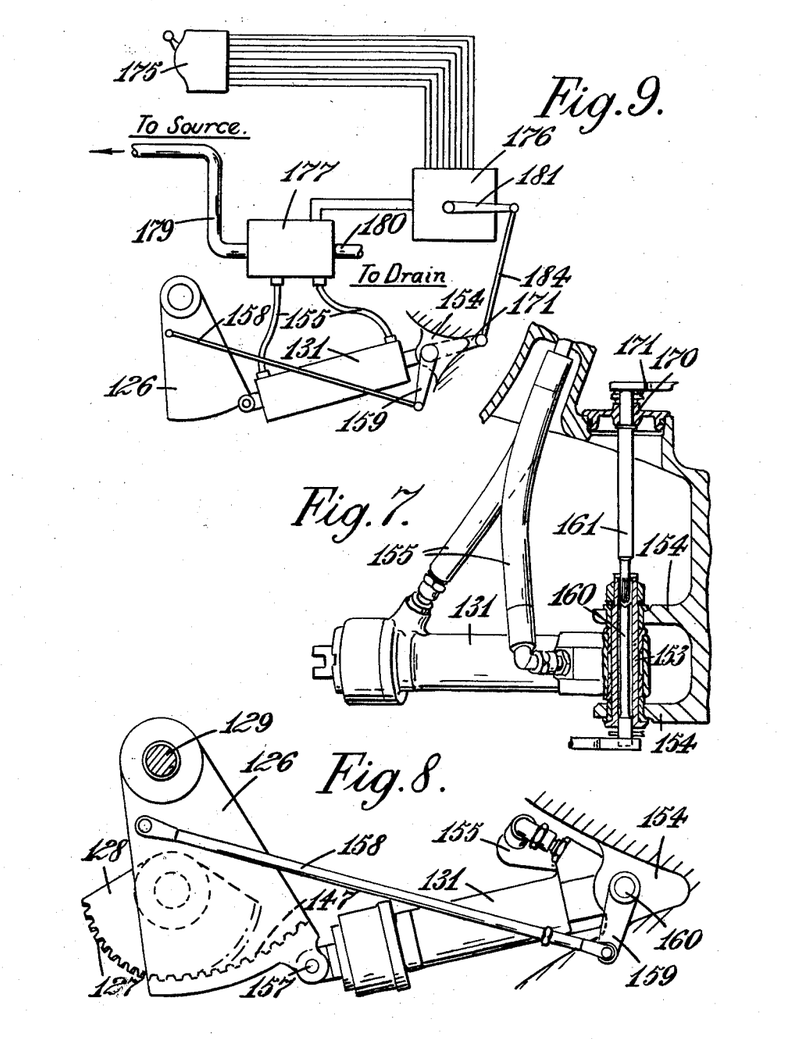
FIGURES 7 and 8 show details of construction of certain parts shown in FIGURE 1.
FIGURE 9 is a diagrammatic representation of a control system for controlling the adjustment of the orientation of the nozzles of the installation shown in FIGURE 1.

Each nozzle mounting further comprises an intermediate sleeve 148 located between a torsion tube 149, to which it is splined, and the sleeve 145, the sleeves 145 and 148, and the tube 149 being coaxially arranged one within the other. The sleeve 148 carries one of the quadrants 128 so that it lies against the quadrant 127 on the sleeve 145. The quadrant 128 is of the same effective radius as the quadrant 127 but the teeth on the quadrant 128 do not align with the teeth on the quadrant 127, they being, instead, slightly offset therefrom as shown in FIGURE 8 of the drawings.

The purpose of this arrangement is to take up the backlash between the quadrants 126 and 127 and thereby prevent or reduce undesirable movement of the nozzle caused by external air loads on the nozzle which could otherwise occur because of the backlash.

To this end the amount of offset is selected so that the backlash between the teeth of the quadrants 126 and 128 is equal and opposite to that between the teeth of the quadrants 126 and 127.

The torque tube 149 extends to within the inner end of the shaft 125 and is here splined to the sleeve 145. Torque is therefore transmitted from the quadrant 128 through the torque tube 149 to the sleeve 145, and from the sleeve 145 to the shaft 125.

The bearing assembly, including the bearings 146 and 146a, the sleeves 145 and 148 and the torque tube 149, is bolted by means of bolts 150 to the bushing 138b, the bolts passing through a facing ring 151 and a flange 152 on an outer sleeve 152a surrounding the bearings 146 and 146a.

The vanes 138 serve to guide the fan discharge flowing through the discharge passages 140 into the nozzles 117. The supporting members 133 help in stiffening the walls of the nozzles.

Details of the jack 131, and the manner in which it is connected, are shown in FIGURES 7 and 8 of the drawings. Referring to these figures, the jack 131 is hinged at one end on a hollow pin 153 journaled in spaced supports 154. The jack piston is pivotally connected as at 157 to a lug on the arcuate periphery of one of the quadrants 126 as shown in FIGURE 8. Two flexible pipes 155 are provided connecting the jack with a source of hydraulic fluid for its operation, the jack being a double acting jack as will now be understood.

The quadrant 126 is connected by a link 158 to a lever 159 carried by a spindle 160 journaled within the hollow pin 153. The spindle 160 extends through the pin 153 and is splined to an extension spindle 161. The extension spindle is journaled in a plan bearing 170 and carries a lever 171. The lever 171 provides the follow-up movement for a stepped control system which is used to control the jack 131, and therefore the orientation of the nozzles 117.

The jack stepped control system may take any known or convenient form, for example, the system may be of the known form diagrammatically illustrated in FIGURE 9 of the accompanying drawings.

Referring to FIGURE 9, a pilot's multi-position selector switch 175 is provided electrically connected to a drum switch 176 which controls an electro-hydraulic valve 177 displacement of which controls the operation of the jack. The valve is electrically displaceable under the control of the drum switch in one direction to communicate one of the pipes 155 with the pipe 179 and the other with the pipe 180, and in the other direction to communicate the other of the pipes 155 with the pipe 179 and said one of the pipes 155 with the pipe 180. The pipe 179 communicates with a source of hydraulic fluid under pressure, and the pipe 180 communicates with a drain.

The switch 175 has a plurality of positions each corresponding to one particular orientation for the nozzles 117. When the switch is moved to select a new orientation for the nozzles, the electro-hydraulic valve is displaced to actuate the jack 131 in the appropriate sense. Operation of the jack adjusts the nozzle orientation and the movement of the nozzles is fed back through the link 158, the lever 159, the spindle 160, the extension spindle 161, the lever 171, the link 184 (see FIGURE 9) and the lever 181 of the drum switch so that the drum switch is rotated as the nozzles are adjusted to their new position. When the nozzles have reached their new position the drum switch operates to de-energize the electro-hydraulic valve which returns to a neutral position, and the jack is hydraulically locked and holds the nozzles in their new position until such time as a further position for the nozzles is selected at the switch 175.

Figure 10:
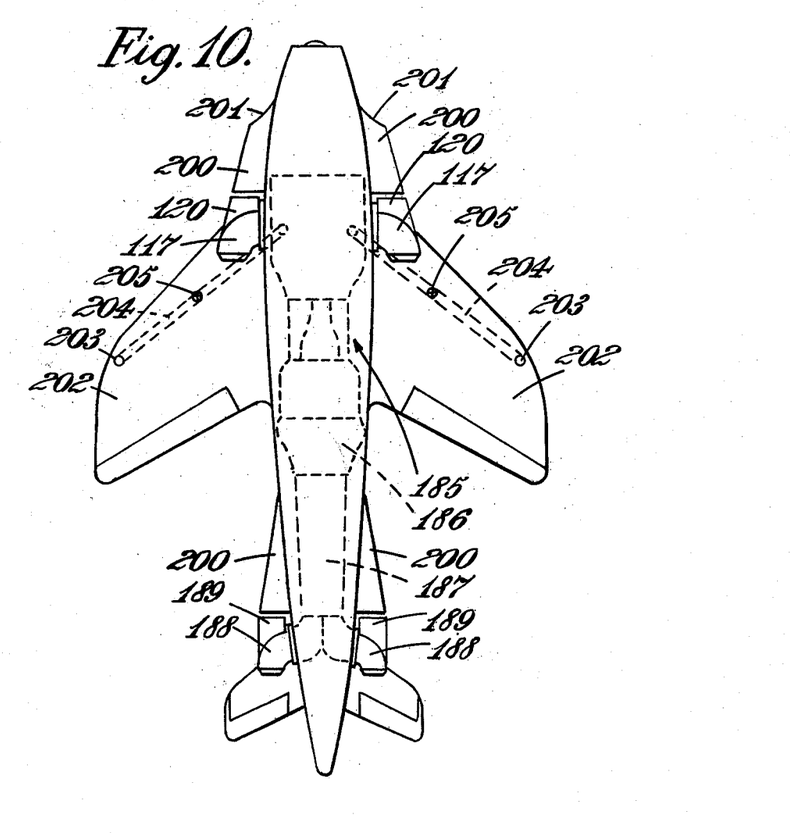
FIGURE 10 is an underneath plan view of an aircraft according to the invention.

FIGURE 10 of the drawings shows an aircraft incorporating a simple gas turbine jet propulsion engine unit as just described.

The engine unit or installation, shown in dotted lines, is generally indicated at 185. The turbine system 186 of the installation discharges the gases which have passed through the system into a jet pipe 187 which feeds a pair of orientable nozzles 188 corresponding to the nozzles 117 of the installation.

The nozzles 188 are mechanically interconnected in any convenient way for orientation with the nozzles 117 by means of the jack 131 previously described, the mechanical interconnection ensuring that each of the nozzles 188 is always directed in the same direction as the other, and in the same direction as the nozzles 117.

The nozzles 188 are each provided with aerodynamic balancing surfaces 189 corresponding to the surfaces 120 on the nozzles 117, and fairings 200 are provided on the aircraft, one for each of the nozzles, the aerodynamic surfaces on each nozzle blending with the adjacent fairing.

Side air intakes 201 are provided on the aircraft, for the entry of air to the engine compressor.

The aircraft has a pair of stub-wings 202 each of which is provided adjacent its tip with a fixed downwardly directed nozzle 203. The nozzles 203 are connected, each by means of a duct 204, with the discharge of the fan 110 of the installation, and an air flow control valve 205 is provided for controlling the flow of air through each of the ducts 204 thereby to control the discharge of each of the nozzles 203.

The nozzles 117 are symmetrically arranged one on each side of the plane of symmetry of the aircraft which extends vertically when the aircraft is in its normal stationary attitude and are so located that when they are both directed vertically downwardly with respect to the aircraft the resultant force of both thrusts created thereby passes through the fore and aft axis of the aircraft ahead of its center of gravity.

The nozzles 188 are similarly arranged with respect to said vertical plane of symmetry and are so located that when they are both directed vertically downwardly with respect to the aircraft, the resultant force of the thrusts created by the nozzles 188 also passes through the fore and aft axis of the aircraft, but aft of the center of gravity of the aircraft.

The nozzles 117 and 188 are furthermore so located that the total resultant force of the thrusts created by the nozzles acts through the center of gravity of the aircraft when all the nozzles are directed vertically downwardly with respect to the aircraft.

Now, it will be understood that if the aircraft is resting on the ground in its normal static attitude, and all four nozzles are directed vertically downwardly with respect to the aircraft, the combined thrusts of the nozzles will create a lift capable of raising the aircraft vertically.

After vertical take-off, an inclination of the nozzles backward of the vertical will provide a forward component of thrust capable of making the aircraft travel forwardly. The greater this inclination the greater the forward thrust. Retention of a slight inclination of the nozzles with respect to the fore and aft axis will provide additional lift for the aircraft when the aircraft is traveling in the forward direction.

Furthermore, braking action may be readily obtained by directing the nozzles slightly forwardly with respect to the aircraft. It is clear, too, that vertical landing is possible under conditions similar to those prevailing for vertical take-off.

During vertical landing and take-off, the wing tip nozzles 203 may be set in operation by opening the valves 205 to aid in the lateral balance of the aircraft. To this end the valves 205 may be differentially adjustable to vary the flow of air through the nozzles 203. In that case the nozzles 203 may also be used to control the aircraft about its roll axis.

Valve means may also be provided to control differentially the flow through the pairs of nozzles 117 and 188 thereby to provide further control of the aircraft.

Figure 12:
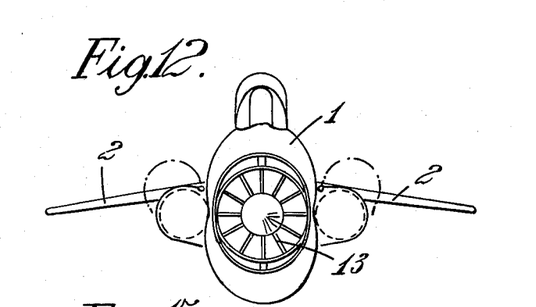
FIGURE 12 is a corresponding front view, as seen in the direction of arrow I of FIGURE 11.
Figures 13, 14:
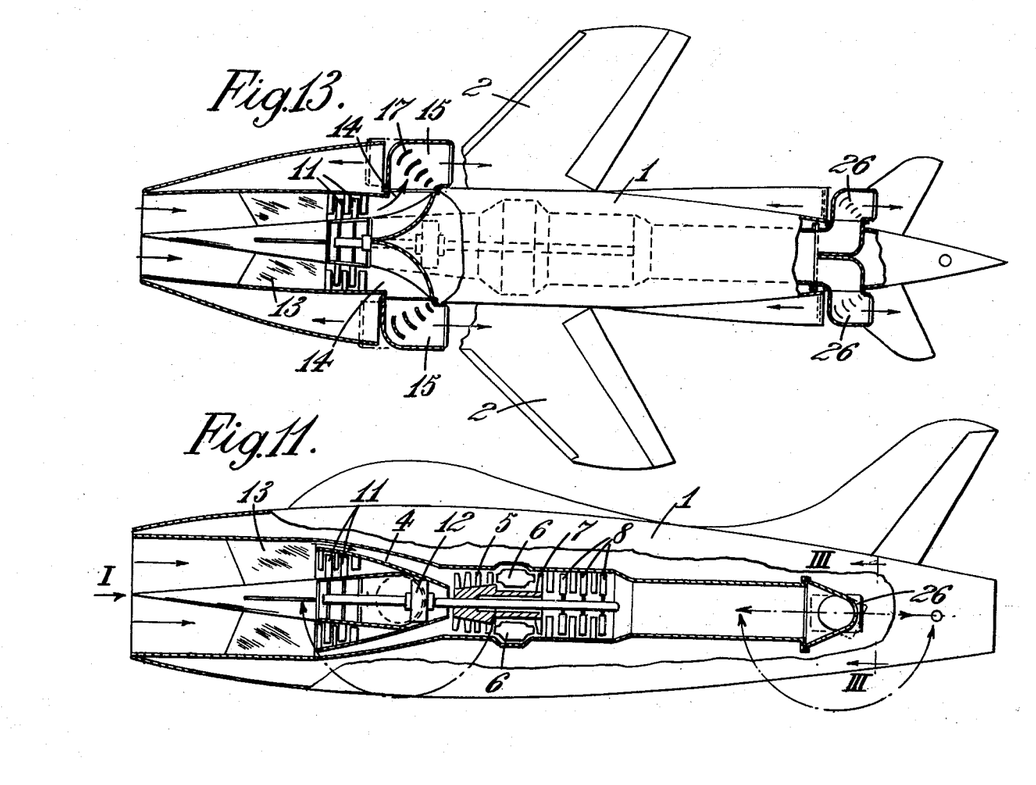
FIGURE 13 is a plan view corresponding to FIGURE 11, with portions taken away.
FIGURE 14 shows, on a larger scale, the assembly of the air compressor and nozzles, and a modification in the air-intake of the engine of the aircraft of FIGURE 11.
Figure 14:
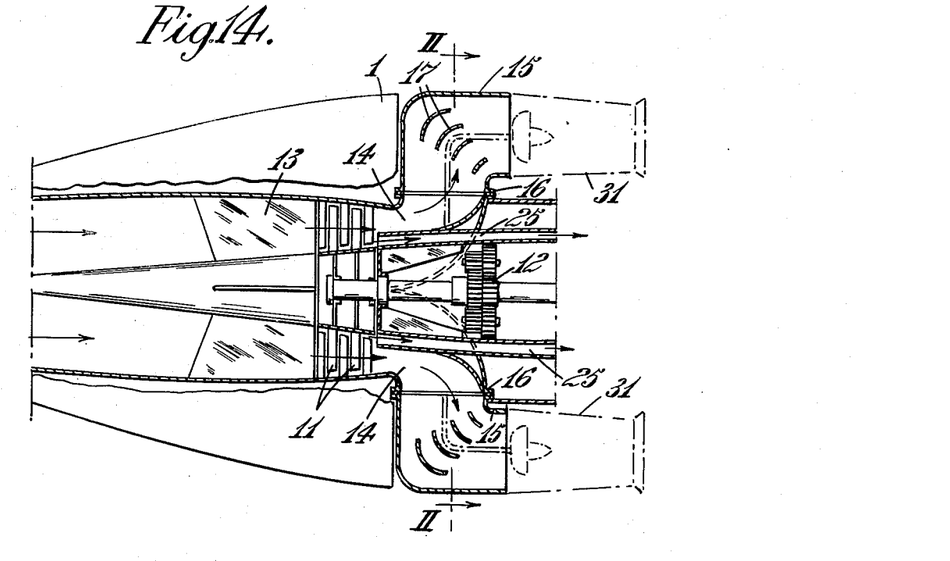

Referring now to FIGURES 11 to 13 the aircraft illustrated has a fuselage 1, and stub wings 2. The aircraft is propelled by means of two air jets supplied by the additional compressor of a jet propulsion unit according to the invention, and two exhaust gas jets supplied by the jet engine of said unit. The said jet engine has upper and lower intakes 4, an axial flow compressor 5, combustion chambers 6, a high pressure turbine 7 driven by the gases discharged from the combustion chambers and driving the compressor 5, and a low pressure turbine 8. Said turbine 8 rotating at a speed lower than turbine 7 drives the additional axial flow air compressor 11 of the unit according to the invention either directly, which is the preferred construction according to the invention shown in FIGURES 1 to 9 or, in some particular cases, through a low-ratio speed reduction gear 12. The air intake to the additional compressor 11 as shown at 13 is aligned with the center line of the engine.

Figure 15:
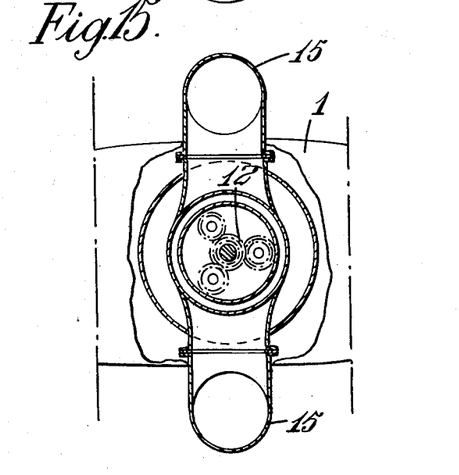
FIGURE 15 is a cross-section made on line II—II of FIGURE 14.
Figure 16:
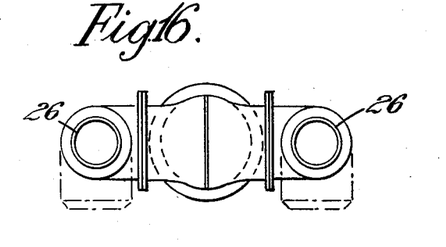
FIGURE 16 is also a cross-section, made on line III—III of FIGURE 11, FIGURE 17 diagrammatically illustrates a device for the synchronous control of the orientation of the air and gas nozzles of the aircraft of FIGURE 11.
Figure 17:
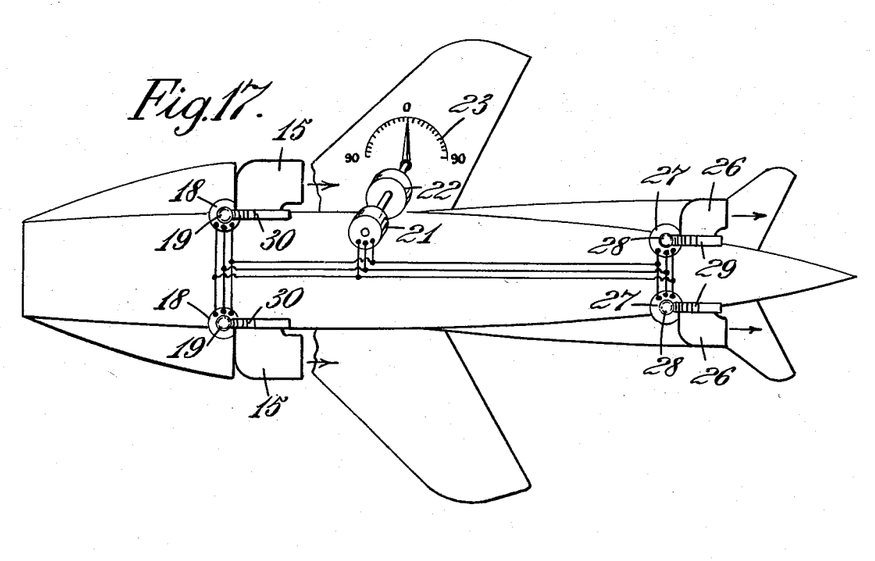

The air discharged from the additional compressor 11 is directed into two lateral passages 14 leading to two orientable air nozzles 15 symmetrically arranged one on each side of the vertical longitudinal plane of symmetry of the aircraft (see also FIGURES 14 and 15). The nozzles 15 are each constituted by an elbow pipe the inlet end of which is adapted to swivel on its axis, on a flange 16, the axes of both flanges being geometrically aligned on a direction transverse to the aircraft as is true of the previous example. In the present example, however, the nozzles 15 are rotatable through an angular range of 180° extending from the backward direction parallel with the fore and aft axis of the aircraft, down to a position at right angles to said line, and further up to the forward direction. Inner vanes 17 arranged within said elbow pipes provide for efficient aerodynamic flow of the air therein and help to stiffen the walls of the pipes.

It may be seen in FIGURE 13 that the entire unit is of a small diameter and thus can be incorporated in a fighter plane.

To adjust the orientation of the nozzles while maintaining them in identical orientation use is made of two synchronous electric motors 18 (see FIGURE 17) coupled to the respective nozzles 15 as by means of a worm gear drive 19, both said motors being fed with electric current from a transmitter 21 coupled, through a speed reducer 22, to an index 23 movable over a graduated dial for indicating the orientation of the nozzle.

The air nozzles are so located that when they are both directed vertically and downwardly the aircraft being in the normal attitude the resultant force of both thrusts created thereby passes through the fore and aft axis of the aircraft ahead of its center of gravity.

The exhaust gas stream is directed to the tail of the aircraft and into two orientable nozzles 26 the design and arrangement of which is of similar type to that of the nozzles 15, the nozzles 26 being located so that the resultant force of both thrusts passes through the fore and aft axis of the aircraft of its center of gravity when the exhaust gas nozzles are both directed vertically and downwardly. The nozzles 15 and 26 are furthermore so located that the total resultant force of the air thrust and of the gas thrust passes through the center of gravity of the aircraft when all the nozzles are directed vertically and downwardly.

The nozzles 26 also may be oriented together while being maintained in identical orientation by means of two synchronous electric motors 27 through worm gear drives 28 (FIGURE 17), said motors being fed in parallel with the air nozzle motors 18 from the transmitter 21.

The interconnection between the worm gear drives 19 and 28 is so designed as to provide for substantially parallel setting of the nozzles 15 and of the nozzles 26, whatever may be their orientation with respect to the fore and aft axis. When the nozzles 15 and 26 are all directed rearwardly, the central axis of discharge through each nozzle is in a common horizontal plane with the central axis of the air intake 13 of the aircraft.

According to another feature of the invention, means are provided to increase the energy supplied by the air jets. These means comprise means to heat the air discharged from the nozzles.

This may be achieved by extending the air nozzles 15 as indicated at 31 in FIGURE 14, and burning fuel in the air passing through the nozzles.

The aircraft just described is capable of vertical take-off and landing, as well as level, climbing and descending and hovering flight in the manner previously described in connection with the aircraft shown in FIGURE 10 in the accompanying drawings.

By way of modification, FIGURE 14 shows that a portion of the air delivered by the additional compressor 11 may be directed through ducts 25 into the intake of the engine compressor 5.

The propulsion unit of the aircraft described with reference to FIGURES 11 to 17 is applicable to any sort of aircraft, such as for instance, airplanes with conventional wings or with stub wings, wingless aircraft, teleguided missiles and others.

Means may be provided to override the control of the synchronous motors 18 and 27, normally ensured by the transmitter 21, which permits an operator adjusting the pairs of nozzles 15 and 26 differentially with respect to each other, or differentially as between the two nozzles of each pair, in order to exert directional control on the aircraft. To this end also, each nozzle, or one nozzle of each pair of nozzles 15 and 26, may be provided with adjustable valve means for controlling the mass flow of air or exhaust gas through the nozzle, thereby to vary the thrust delivered by the nozzle and the nozzle with which it is paired. Such valve means and/or differential control means may also be used to trim the aircraft during flight.

In order to reduce the gyroscopic torque created by rotation of the two rotary systems of the unit, these systems may be arranged to rotate in opposite directions.

The reduction of gyroscopic torque is particularly useful when there is no reduction gearing in the drive between the low pressure turbine and the additional compressor, and valuable also in aircraft having but a single engine unit according to the invention.

Instead of providing an aircraft with only a single propulsion unit as hereinbefore described, two or more such units may be provided. In this case it is envisaged that at least one pair of orientable nozzles such as 15 or 117 would be provided for each of the additional compressors, and at least one further orientable nozzle connected to receive for discharge the, or part of the, jet stream from the engines. The control means then would have to be designed for selectively orientating all the nozzles in unison in order to impart to the aircraft propelling or braking thrust or vertical lift or a combination of lift and thrust, and all the nozzles would have to be located so that when they are oriented vertically with the aircraft in its normal or substantially normal attitude for horizontal flight, and the engines are operated, the resultant line of thrust on the aircraft passes through the center of gravity of the aircraft.

Figure 18:
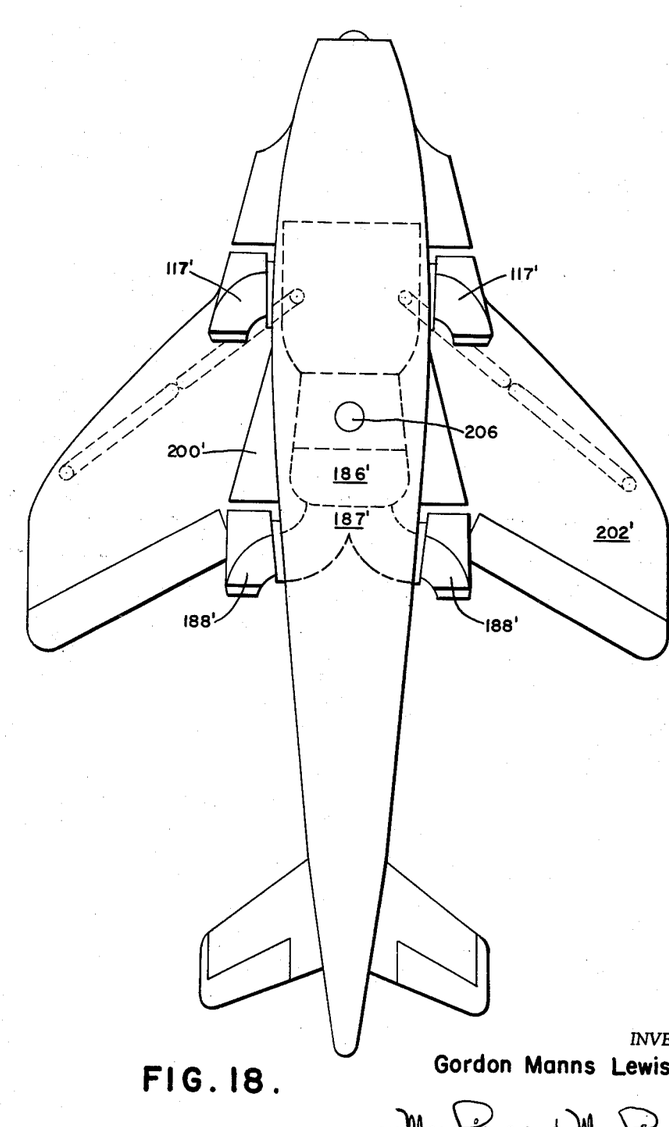
FIGURE 18 is a view similar to FIGURE 10 but showing the compressed air nozzles and the exhaust gas nozzles spaced equally from the center of gravity of the aircraft.

In FIGURE 18 parts corresponding to similar parts of FIGURE 10 are indicated by the same reference numerals with prime added thereto. The center of gravity of the aircraft is indicated at 206. It will be noted that the compressed air nozzles 117' are located forwardly of the center of gravity 206 of the aircraft and the hot exhaust gas nozzles 188' are located aft of the center of gravity of the aircraft, the nozzles 117' and 188' being spaced equal distances from the center of gravity of the aircraft.

What is claimed is:

1. An aircraft combination comprising a gas turbine jet propulsion engine having a compressor system which includes an axial flow first compressor and a second compressor, a combustor, and a turbine system adapted to drive said compressors, a forwardly facing air intake and ducting in fluid communication with said air intake for delivery of air to said compressor system, nozzle duct means with at least one jet propulsion air nozzle located adjacent said compressor system, ducting for conveying air compressed by said first compressor to said nozzle duct means, means locating and rotatably supporting said nozzle duct means alongside said engine, enabling said nozzle duct means to be positionable to vary the direction of discharge from said air nozzle at least between a rearward direction and a downward direction, and so that said duct means is forward of the aircraft center of gravity, and the central axis of discharge through said nozzle duct means intersects the axis of rotation of said duct means at a point which lies in a common horizontal plane with the line of the resultant intake momentum drag, whereby in horizontal flight of the aircraft with the nozzle duct means adjusted to discharge rearwardly, the resultant of the intake momentum drag and the resultant of the reaction thrust from said nozzle act in opposition in a common approximately horizontal plane, and means in drive connection with said adjustable duct means to change and maintain its desired adjusted position.

2. A combination as claimed in claim 1 including second nozzle duct means with at least one jet propulsion gas nozzle located rearward of said turbine system, ducting for conveying exhaust gas from said turbine system to said second nozzle duct means, means locating and rotatably supporting said second nozzle duct means, and means in drive connection with said second duct means to change and maintain its desired position.

3. A combination as claimed in claim 2 including an outer skin surrounding said aircraft, a pair of said air nozzles, one projecting outside each side of said skin, and a pair of said gas nozzles, one projecting outside each side of said skin.

4. A combination as claimed in claim 3 wherein all said nozzle duct means are of similar elbow form.

5. A combination as claimed in claim 3 wherein said means locating and rotatably supporting all said nozzle duct means is adapted to enable said direction of discharge to be varied from said rearward direction through said downward direction to a direction substantially forwards and downwards.

6. A combination as claimed in claim 2 wherein said drive means is adapted to rotate said first and second nozzle duct means at substantially equal angular speeds.

7. A method of performing a vertical take-off followed by transition to horizontal forward flight of an aircraft of the flat-riser kind which includes at least one turbofan jet engine, which method comprises the steps of operating the engine to produce at least one output flow of fan compressed air and at least one output flow of turbine exhaust gas, discharging said flows downwards as propulsive jets from locations on the aircraft which are forward and rearward respectively of the aircraft center of gravity to achieve vertical take-off and thereafter deflecting said jets rearwards until they act in a substantially horizontal common plane.

8. A method of performing a vertical take-off followed by transition to horizontal forward flight of an aircraft of the flat-riser kind which includes a turbofan jet engine housed in the fuselage of the aircraft, and arranged to provide two output flows of fan compressed air and two output flows of turbine exhaust gas, which method comprises the steps of operating the engine to produce said flows, discharging said flows downwards as propulsion jets from said aircraft from forward and rearward locations at both opposing sides of the fuselage to achieve vertical take-off, the arrangement being such that the resultant upthrust passes through the aircraft center of gravity, and thereafter deflecting said jets simultaneously rearwards and at a common rate of deflection until they act in a substantially horizontal common plane.

9. A method according to claim 8 wherein the jets discharged from the forward locations are discharged slightly outboard of the jets discharged from the rearward locations.

10. A method of performing a vertical take-off and transition to forward flight of an aircraft of the flat-riser kind which mounts in its fuselage a gas turbine jet propulsion engine provided with a forwardly-facing air intake system, the engine being further provided with two pairs of propulsion nozzles located respectively fore and aft of the aircraft center of gravity in a common horizontal plane through which the intake momentum drag acts in forward flight, which nozzles are rotatable to control the direction of their discharge, said method comprising discharging engine fluid downwards through the nozzles to obtain a resultant upthrust which passes through the aircraft center of gravity, and after take-off rotating the nozzles rearwards simultaneously and at the same rate to obtain forward thrust without upsetting the aircraft about its pitch axis, and checking the rearward rotation of the nozzles when the resultants of the forward thrust and the intake momentum drag act along the same line in opposing directions.

11. An aircraft power plant comprising
 (a) a gas turbine jet propulsion engine having a compressor system which includes an axial flow first compressor and a second compressor, a combustor, and a turbine system adapted to drive said compressors,
 (b) first nozzle duct means with at least one jet propulsion nozzle located adjacent said compressor system,
 (c) ducting for conveying air compressed by said first compressor to said first nozzle duct means,
 (d) second nozzle duct means with at least one jet propulsion gas nozzle located rearward of said turbine system,
 (e) ducting for conveying exhaust gas from said turbine system to said second nozzle duct means,
 (f) all said nozzle duct means being of similar elbow form,
 (g) means locating and rotatably supporting said nozzle duct means alongside said engine, enabling said nozzle duct means to be positionable to vary the direction of discharge from said nozzles at least between a rearward direction and a downward direction, and so that said first nozzle duct means is forward of the aircraft center of gravity and said second nozzle duct means is aft of said center of gravity, and
 (h) means in drive connection with each of said adjustable duct means to change and maintain its desired adjusted position,
 (i) said locating and supporting means being so disposed on said engine that, when said nozzle duct means are adjusted to discharge rearwardly, said directions of discharge of air and of gas are substantially in a common horizontal plane.

12. A power plant as claimed in claim 11, wherein said drive means is adapted to rotate said first and second nozzle duct means at substantially equal angular speeds.

13. A power plant as claimed in claim 11 including within each of said nozzles a plurality of gas flow deflector vanes extending transversely across said nozzle.

14. An aircraft power plant according to claim 11, including means for selectively introducing fuel for combustion in the air flow through said first nozzle duct means.

15. An aircraft combination comprising
 (a) a gas turbine jet propulsion engine having a compressor system which includes an axial flow first compressor and a second compressor, a combustor, and a turbine system adapted to drive said compressors,
 (b) an air intake and ducting in fluid communication with said air intake for delivery of air to said compressor system,
 (c) an aircraft fuselage enclosing said engine,
 (d) a first pair of nozzle duct means, each with a jet propulsion air nozzle located adjacent said compressor system outside said fuselage,
 (e) ducting for conveying air compressed by said first compressor to said first nozzle duct means,
 (f) a second pair of nozzle duct means, each with a jet propulsion gas nozzle located rearward of said turbine system outside said fuselage,
 (g) ducting for conveying exhaust gas from said turbine system to said second nozzle duct means,
 (h) means locating and rotatably supporting said nozzle duct means alongside said engine, enabling said nozzle duct means to be positionable to vary the direction of discharge from said nozzles at least between a rearward direction and a downward direction, and so that said first pair of nozzle duct means are forward of the aircraft center of gravity and are at opposite sides of said fuselage, spaced apart by the width of said fuselage, and said second pair of nozzle duct means are aft of said center of gravity and are at opposite sides of said fuselage spaced apart by the width of said fuselage, and (i) means in drive connection with said adjustable duct means to change and maintain its desired adjusted position.

16. An aircraft combination according to claim 15 wherein said nozzle duct means are all equidistant from said center of gravity.

17. The combination as claimed in claim 15 in which said means for locating and rotatably supporting said nozzle duct means is also capable of rotating the nozzles to a forwardly-directed position so that the discharge from the nozzles will be directed in a substantially forward direction to effect braking of the aircraft.

18. An aircraft power plant comprising
(a) a gas turbine jet propulsion engine having a compressor system which includes an axial flow first compressor and a second compressor, a combustor, and a turbine system adapted to drive said compressors,
(b) a pair of first ducts communicating with the downstream end of said first compressor and adapted to direct flows of air away from the two sides of said engine,
(c) a pair of first nozzle means, each adapted to angularly deflect a flow of air to emerge through an outlet thereof,
(d) means mounting each of said first nozzle means alongside said engine to receive the flow of air from a respective one of said first ducts, and to rotate, and thereby vary the direction in which said air flow emerges from said respective outlet, at least between a rearward and a downward direction,
(e) said outlets of said first nozzle means being spaced apart transversely of said engine by a distance exceeding the over-all widths of each of said second compressor, combustor, and turbine system,
(f) a pair of second ducts communicating with the downstream end of said turbine system and adapted to direct flows of gas away from the two sides of said engine in directions approximately parallel to the respective directions of said flows of air in said first ducts,
(g) a pair of second nozzle means each adapted to angularly deflect a flow of gas to emerge through an outlet thereof,
(h) and means mounting each of said second nozzle means alongside said engine to receive the flows of gas from a respective one of said second ducts, and to rotate, and thereby vary the direction in which said gas flow emerges from said respective outlet, at least between a rearward and a downward direction,
(i) said outlets of said second nozzle means being spaced apart, with an over-all transverse dimension which is less than the over-all transverse dimension of said pair of first nozzle means.

19. An aircraft power plant as claimed in claim 18 in which the air and gas nozzles are similar in nature.

20. An aircraft power plant as claimed in claim 19 in which the air and gas nozzles are of elbow type.

21. An aircraft power plant as claimed in claim 18 wherein the discharges from all the nozzles move substantially in planes parallel to the axis of the engine during rotation from vertical to horizontal so that there is no substantial component of thrust transverse to the aircraft.

22. An aircraft power plant as claimed in claim 18 wherein the axes of rotation of the air and gas nozzles on either side of the engine are substantially parallel so that they are disposed substantially in a common plane.

23. A method of performing a vertical take-off and transition to forward flight of an aircraft of the kind which mounts in the fuselage a gas turbine jet propulsion engine provided with a forwardly-facing air intake and compressor system, the engine being further provided with two pair of propulsion nozzles located respectively forwardly and rearwardly of the aircraft center of gravity in a common horizontal plane, which nozzles are rotatable to control the direction of their discharge, said forwardly located nozzles having outlets spaced apart transversely of said engine by a distance exceeding the over-all width of each of the engine and the air intake system, said rearwardly located nozzles having outlets spaced apart a transverse dimension less than that of the forwardly located nozzle outlets, said method comprising the steps of (a) rotating the nozzles to a position in which they will discharge in a downward direction to obtain a resultant upthrust,
(b) conveying compressed air from the air intake and compression system to the forwardly located nozzle outlets so that the discharge from these outlets will be at a distance from the aircraft,
(c) conveying hot exhaust gas from the engine to the rearwardly located nozzle outlets so that the discharge from these outlets will be at a less distance from the aircraft than the discharge from the forwardly located nozzle outlets, and after take-off,
(d) rotating the nozzles so that the discharges therefrom will be in a substantially rearward direction to effect horizontal flight of the aircraft and the discharges from the nozzle outlets will maintain their relative distances from the aircraft.

24. An aircraft combination comprising
(a) a gas turbine jet propulsion engine having a compressor system which includes an axial flow first compressor and a second compressor, a combustor, and a turbine system adapted to drive said compressors,
(b) an air intake and ducting in fluid communication with said air intake for delivery of air to said compressor system,
(c) nozzle duct means with at least one jet propulsion air nozzle located adjacent said compressor system,
(d) ducting for conveying air compressed by said first compressor to said nozzle duct means,
(e) means locating and rotatably supporting said nozzle duct means alongside said engine, enabling said nozzle duct means to be positionable to vary the direction of discharge from said air nozzle at least between a rearward direction and a downward direction, and so that the axis of rotation of said duct means lies in a fore-and-aft plane which is substantially radial with respect to the axis of said first compressor and said duct means is forward of the aircraft center of gravity, and
(f) means in drive connection with said adjustable duct means to change and maintain its desired adjusted position.

25. An aircraft combination comprising
(a) a gas turbine jet propulsion engine having a compressor system which includes an axial flow first compressor and a second compressor, a combustor, and a turbine system adapted to drive said compressors,
(b) an air intake and ducting in fluid communication with said air intake for delivery of air to said compressor system,
(c) an aircraft fuselage enclosing said engine and having a wing,
(d) a pair of nozzle duct means, each with a jet propulsion air nozzle located adjacent said compressor system outside said fuselage,
(e) ducting for conveying air compressed by said first compressor to said nozzle duct means,
(f) means locating and rotatably supporting said nozzle duct means alongside said engine, enabling said nozzle duct means to be positionable to vary the direction of discharge from said air nozzle at least between a rearward direction and a downward direction, and so that said pair of nozzle duct means are forward of the aircraft center of gravity and are at opposite sides of said fuselage, spaced-apart by the width of said fuselage, and (g) means in drive connection with said adjustable duct means to change and maintain its desired adjusted position, (h) said nozzles being located under the wing leading edge.

26. An aircraft with a fuselage having opposing side walls joined together by top and bottom portions which houses (a) a gas turbine jet propulsion engine having a compressor system which includes an axial flow first compressor and a second compressor, a combustor, and a turbine system adapted to drive the compressors, (b) a forward pair of nozzles located adjacent the compressor system and forward of the center of gravity of the aircraft, (c) ducting for supplying to the forward pair of nozzles air compressed by the first compressor, (d) a rearward pair of nozzles located downstream of the turbine system, and aft of the center of gravity of the aircraft, (e) ducting for supplying turbine exhaust gas to the rearward pair of nozzles, (f) the nozzles of each pair projecting from opposing side walls of the fuselage (g) and being rotatably mounted at the downstream ends of their respective supply ducting so as to vary their directions of discharge, (h) the nozzles projecting from the same side wall having approximately parallel axes of rotation the forward one of which intersects the compressor section, (i) and means for simultaneously rotating all the nozzles at equal angular speeds (j) between a rearward setting for forward thrust, a downward setting for upthrust and a setting for braking thrust which is substantially forwards of the downward setting, 27. An aircraft according to claim 26 in which the pairs of nozzles are spaced equally from the center of gravity of the aircraft.

28. An aircraft power plant comprising (a) a horizontal gas turbine jet propulsion engine having a compressor system which includes an axial flow first compressor and a second compressor, a combustor and turbine system adapted to drive the compressors, which engine has a rotational axis, (b) a forward pair of directionally-adjustable nozzles which flank the compressor system, (c) ducting for supplying to the forward pair of nozzles air compressed by the first compressor, (d) a rearward pair of directionally-adjustable nozzles located downstream of the turbine system, (e) ducting for supplying turbine exhaust gas to the rearward pair of nozzles, (f) all the nozzles being of similar elbow form and mode of adjustment, (g) the nozzles of each pair projecting from opposing flanks of the engine and being rotatably mounted on the downstream ends of their respective supply ducting so as to vary their directions of discharge, (h) and means for simultaneously rotating all four nozzles to vary their direction of discharge between rearwards, downwards, and forwards of downwards, (i) the nozzles projecting from the same flank of the engine having parallel axes of rotation, (j) and the axes of rotation of the nozzles of each pair meeting one another within the engine in a vertical plane containing the rotational axis of the engine.

References Cited by the Examiner

UNITED STATES PATENTS 2,885,159    5/59    Ashwood _______________ 244—12
2,912,188    11/59    Singelmann ____________ 244—12

FERGUS S. MIDDLETON, *Primary Examiner.*

R. DAVID BLAKESLEE, *Examiner.*